United States Patent [19]
Bell

[11] Patent Number: 6,011,888
[45] Date of Patent: Jan. 4, 2000

[54] GRADIENT INDEX LENS ARRAY ASSEMBLY COMPRISING A PLURALITY OF LENS ARRAYS OPTICALLY COUPLED IN A LENGTHWISE DIRECTION

[75] Inventor: Conrad John Bell, Webster, N.Y.

[73] Assignee: Xerox Corporation, Stamford, Conn.

[21] Appl. No.: 08/314,749

[22] Filed: Sep. 29, 1994

[51] Int. Cl.[7] .................................................. G02B 6/06
[52] U.S. Cl. ............................................................ 385/116
[58] Field of Search ................................... 250/227, 578; 385/116, 117, 902

[56] References Cited

U.S. PATENT DOCUMENTS

| | | | |
|---|---|---|---|
| 4,147,928 | 4/1979 | Crean et al. | 235/454 |
| 4,397,409 | 8/1983 | Fantuzzo et al. | 222/414 |
| 4,742,240 | 5/1988 | Yamanishi et al. | 250/578 |
| 5,260,718 | 11/1993 | Rommelmann et al. | 346/107 R |

OTHER PUBLICATIONS

James D. Rees and William Lama, *Some Radiometric Properties of Gradient–Index Fiber Lenses*, (Applied Optics, vol. 19, No. 7, Apr. 1, 1980, pp. 1065–1069).

*Primary Examiner*—Akm E. Ullah
*Attorney, Agent, or Firm*—J. R. Sakmyster

[57] ABSTRACT

A gradient index lens assembly is formed by joining a plurality of separate lens arrays end to end to form a lens array assembly of extended length. This concept is especially useful in machines for copying large documents where lens arrays of up to 36 inches in length are required. A single lens array of this length is expensive to manufacture but can be approximated by three shorter 12-inch lenses at a fraction of the price of the single, unitary lens. Each of the plurality of the lens arrays are masked at their end, the mask overlapping the end fibers. The lens arrays are joined together in an alternate staggered configuration so that light transmitted through each lens array is optically coupled or stitched at the interfaces to optically form a single, continuous line of exposure at an image plane.

4 Claims, 2 Drawing Sheets

GRADIENT INDEX LENS ARRAY ASSEMBLY COMPRISING A PLURALITY OF LENS ARRAYS OPTICALLY COUPLED IN A LENGTHWISE DIRECTION

BACKGROUND AND MATERIAL DISCLOSURE STATEMENT

This invention relates to a gradient index lens array assembly of the type used in short focal length optical systems for copiers and printers and, more particularly, to a relatively inexpensive lens array assembly comprising a plurality of lens arrays which are attached together lengthwise and whose output is optically coupled to project a single exposure line onto an imaging plane.

There are, at present, a number of commercial copiers which incorporate a gradient index lens array in an optical system to illuminate a document placed on a document platen. The lens array forms a focused, inverted erect image of the document on a charged surface of a photoconductor or imaging plane. The gradient index lens array comprises a plurality of light conducting fibers made of glass or synthetic resin which has a refractive index distribution in a cross section thereof that varies parabolically outward from a center portion thereof. Each fiber acts as a focusing lens to transmit part of an image of an object placed near one end, e.g., a document placed on a platen. An assembly of fibers, typically in a two row linear array, transmit and focus an image of the object. The fiber lenses are produced under the trade name "SELFOC"; the mark is registered in Japan and is owned by the Nippon Sheet Glass Co., Ltd. The lens arrays are characterized by having a short focal length and can be used in an optical system having a relatively short total conjugate, thus, enabling relatively compact copiers. Commercial copiers such as the Canon PC III. utilize lens arrays of this type. The linear array for this type of copier has a length equal to the length of the document being copied; e.g., a length of approximately 12 inches. The arrays are also used in copiers which reproduce large documents, such as blueprints and engineering drawings which may have widths up to 36 inches. The Xerox 2510 and 2520 copiers, for example, use a gradient index lens arrays having a 36-inch width. It is known that, as the length of the array increases, the manufacturing process becomes more complex and the yield decreases. This is one of the reasons that as lens arrays increase beyond 12 inches, the costs mount at a disproportionately higher rate. For example, to double a 12-inch array to 24 inches, would result in a cost increase greater than 5× rather than 2×. It is therefore desirable to provide a gradient index lens array capable of copying documents wider than the conventional 12-inch length while maintaining cost increases in proportion to the length increase. The present invention provides a lens array assembly which comprises two or more lens assemblies mounted in a staggered configuration to a common substrate. The ends of the lens array are masked along a common interface to enable an optical coupling of each lens array output. With this configuration, for example, three 12-inch lens arrays are physically mounted end to end and their outputs optically stitched together to effectively function as an integral or unitary 36-inch lens array forming a 36-inch line exposure at a photoreceptor. The combined cost of the three joined 12-inch lens arrays is a fraction of the cost of the single, unitary 36-inch lens array.

It is known in the art to electronically "stitch" together segments of imaging components in a optical system which includes a gradient index lens array. U.S. Pat. No. 5,260,718 issued Nov. 9, 1992 discloses linear print bars in a staggered two-row arrangement, the outputs of the print bars being electronically coupled and projected through a pair of tilted linear gradient index lens arrays to form a focused, exposed line on the surface of the photoreceptor. In U.S. Pat. No. 4,742,240 light is reflected from a pair of tilted arrays onto two rows of staggered CCD line sensors whose outputs are electrically combined. U.S. Pat. No. 4,147,928 discloses a similar concept where staggered sensors are imaged through an associated conventional lens. Not shown in the prior art is the concept of connecting a plurality of staggered gradient index lens arrays in the lengthwise direction and coupling the light outputs to form a single exposure line at a photoreceptor.

More particularly, the present invention relates to a gradient index lens array assembly comprising a plurality of linear gradient index lens arrays, each array having two staggered rows of optical fibers extending along the length of each array, each array connected in a staggered end-to-end configuration to form an extended length linear array assembly.

DESCRIPTION OF THE INVENTION

Figure 1:
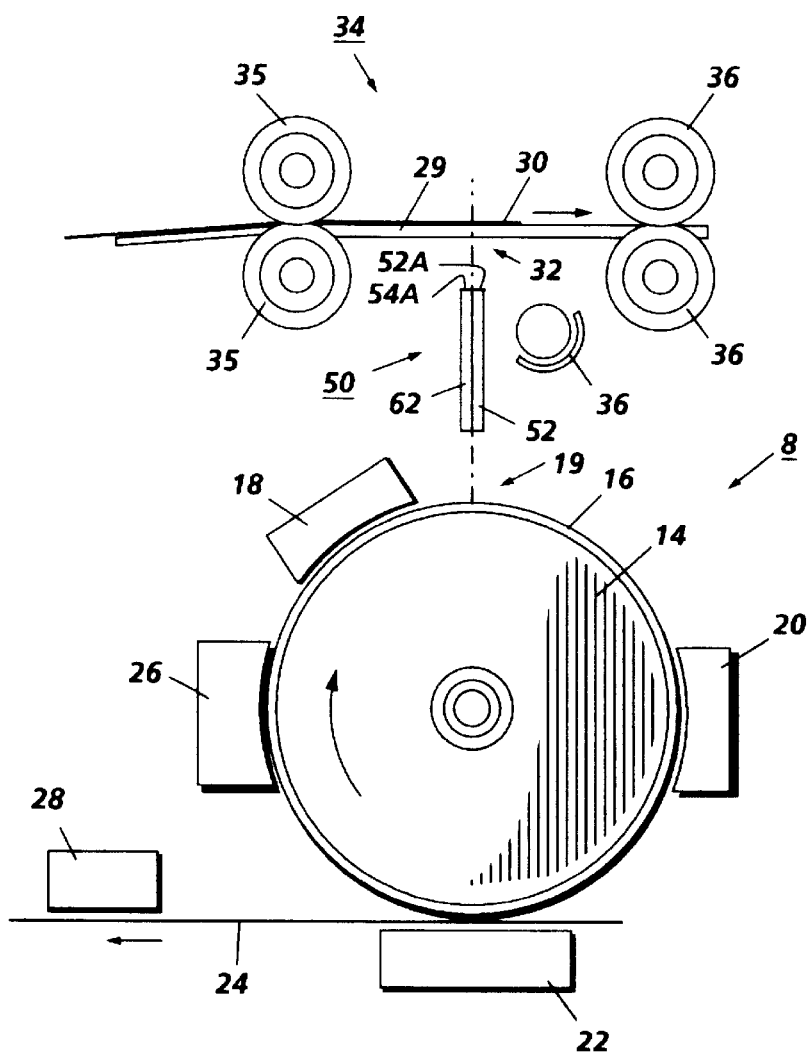
FIG. 1 is a side schematic view of a copier incorporating the gradient index lens array assembly of the present invention.

Referring to FIG. 1 of the drawings, there is shown a xerographic type reproduction machine 8 incorporating the gradient index lens array assembly of the present invention. Machine 8 is particularly adapted to copy documents having long widths such as blueprints and the like having widths of up to 36 inches but the invention is not limited to this specific embodiment. It is understood that the photoreceptor, fuser and developer stations are all modified to adjust to the increased size of the document. Briefly, and as will be familiar to those skilled in the art, the machine xerographic components include a recording member, shown here in the form of a rotatable drum photoreceptor 14 having a photoconductive surface 16. Other photoreceptor types such as belt, web, etc. may be used instead. Operatively disposed about the periphery of drum 14 are charge station 18, for placing a uniform charge on the photoconductive surface; exposure station 19 where the previously charged surface 16 is exposed to image rays of a document 30 being copied or reproduced; development station 20 where the latent electrostatic image created on photoconductive surface 16 is developed by appropriately charged toner; transfer station 22 for transferring the developed image to a suitable copy substrate material such as a copy sheet 24 brought forward in timed relation with the developed image on surface 16, and cleaning station 26 for removing leftover developer from surface 16 and neutralizing residual charges thereon. Following transfer, sheet 24 is carried forward to a fusing station 28 where the toner image is fixed. These xerographic processing stations and the steps incident to operation thereof, are well known in the prior art as exemplified by the disclosure of U.S. Pat. No. 4,397,409 whose contents are hereby incorporated by reference. Referring still to FIG. 1, platen 29 supports a document 30 which is fed from the left hand side of the Figure (front of the machine) and is moved past a scan strip area 32 by a constant velocity type transport 34. As will be understood, scan strip 32 is, in effect, a narrow width scan line extending across the width of platen 30 (into the page) at a desired point along the platen where the document is scanned line by line as the document is moved along the platen surface by transport 34. Transport 34 has two sets of input and output feed roll pairs 35, 36, respectively, on each side of scan strip 32 for moving a document across platen 30 at a predetermined speed. Exposure lamp 36 is provided to illuminate scan strip 32. The image rays from the document line scanned are projected and focused by a gradient index lens array 50 having a sufficient length (36 inches in this embodiment) to expose the photoconductive surface 16 of the moving drum 14 at exposure station 19. In a preferred embodiment, lens array 50 comprises three SLA 6 SELFOC lenses assembled end to end in a lengthwise direction in a manner described below to form the 36-inch lens array assembly.

Figure 3:
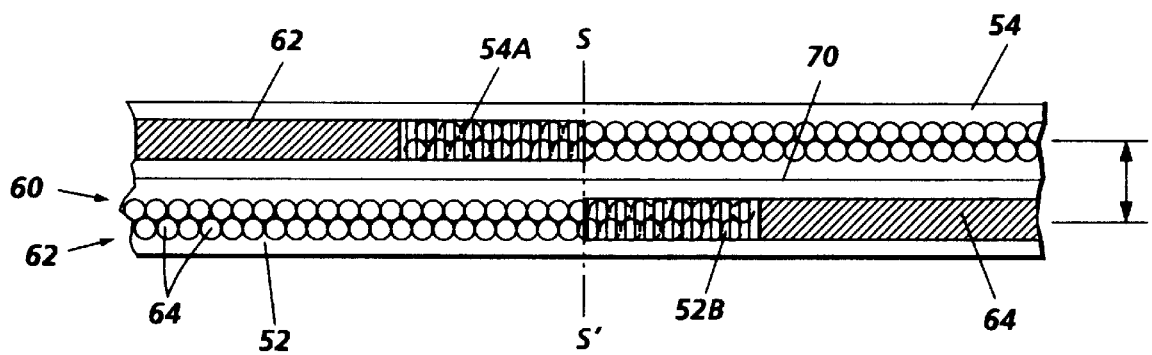
FIG. 3 is a top enlarged view of a portion of the lens array of FIG. 2 illustrating the masking of adjacent row ends.
Figure 2:
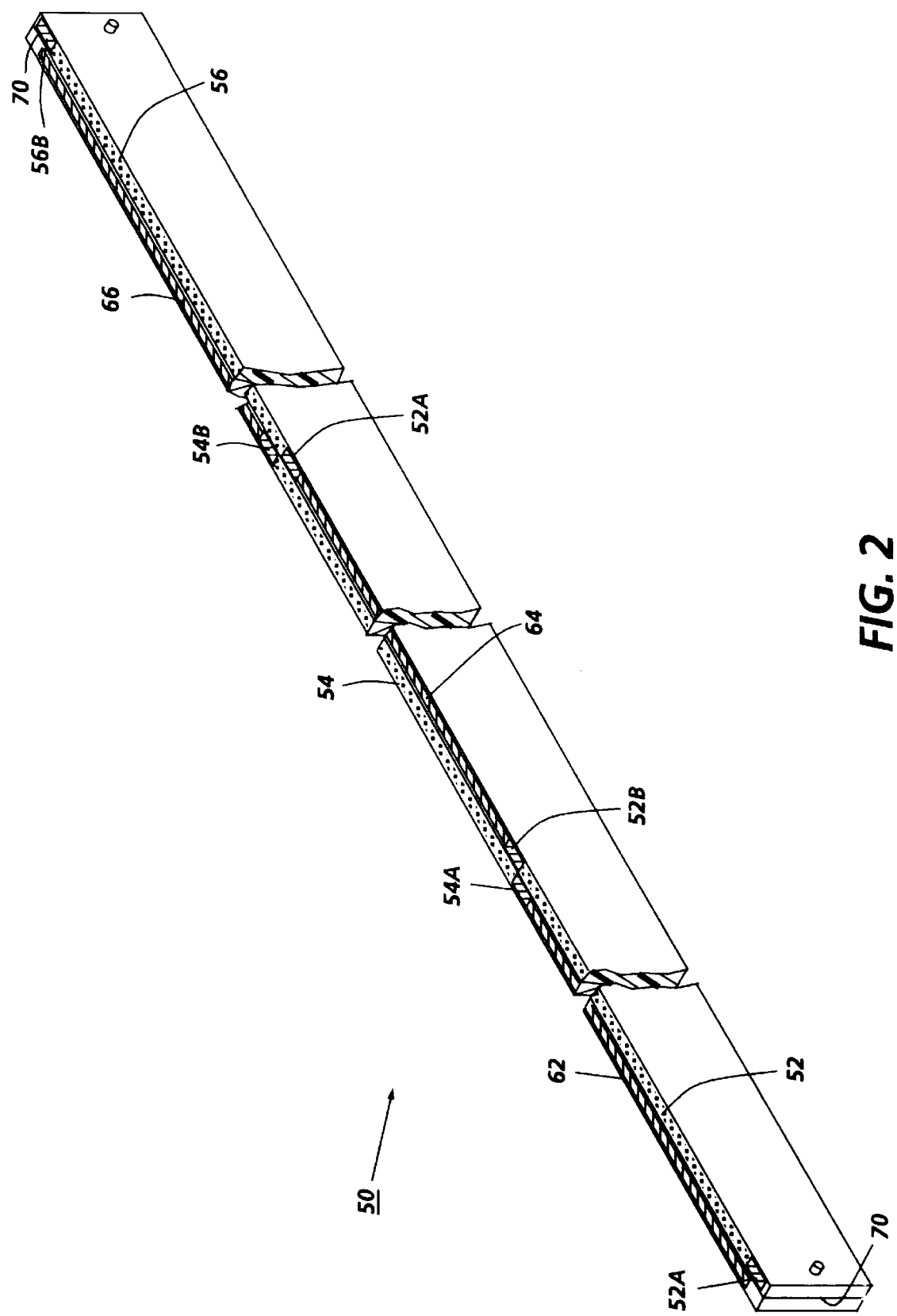
FIG. 2 is a perspective view of the lens array of FIG. 1 showing details of the assembly of the three lens arrays.

Referring now to FIG. 2, there is shown a top perspective view of lens array 50. Array 50 is comprised of lens arrays 52, 54, 56 joined together end to end in a staggered configuration. Each lens array consists of two bundled rows 60, 62 (FIG. 3) of fibers 64. Lens fibers 64 are arranged in two parallel rows, the centerlines of the lens fibers of one row being offset from the centerlines of the lens fibers of the other row to increase packing density. The ends of the entrance face of each array (the face approximate to platen 29) are covered by masking segments 52A, 52B, 54A, 54B and 56A, 56B, Respectively. These segments mask optically overlapping lens elements so as to provide in effect, one continuous lens; e.g., the ends of rows 60, 62 of each array 52, 54, 56 overlap at the ends. The fibers of array 54 are effectively "stitched" or optically coupled to the fibers of array 52 along an imaginary line S - S' (FIG. 3) bisecting the two adjoining rows. The lens assembly is "filled in" to form a unitary, rectangular solid member by adding resin segments 62, 64, 66 which are bonded to the sides of the arrays 52, 54, 56, respectively.

Assembly 50, in a preferred embodiment, comprises three SLA lens arrays. The lens arrays are side mounted to both sides of a vertical, central, single thin metal mounting support 70. One lens array is bonded to one side of support 70, the next lens is bonded to the other side of the support 70 and the third to the opposite side again so that fibers at the ends of the array are in the overlapping position shown in dotted form in FIG. 3. The opaque masks are then affixed in place.

Lens assembly 50 is able to form a single line exposure despite the staggering of the lens arrays, due to the unique characteristics of the SELFOC lens. Referring to an article by James D. Rees and William Lama entitled, *Some Radiometric Properties of Gradient-Index Fiber Lenses,* (Applied Optics, Volume 19, No. 7, Apr. 1, 1980, pages 1065–1069) whose contents are hereby incorporated by reference, it is seen that any single exposure point at an image plane has a radiance distribution comprised of overlapping individual illumination profiles from a group of fiber ends. Thus, from any exposure point on the surface 16 of the photoreceptor drum 14 illumination is being received from a group of fibers from each lens array. Referring to FIGS. 1 and 2, assuming lens array assembly 50 has the orientation shown in FIG. 2, lens array 52 and 56 will receive light reflected from the line being scanned a short time and distance before array 54 receives light from the same line. As long as the lamp 36 illuminates the field of all of the lens arrays at 1× magnification, focused line images comprising the three imaged segments are formed at the photoreceptor as a continuous line of exposure.

While the embodiment disclosed herein is preferred, it will be appreciated from this teaching that various alternative, modifications, variations or improvements therein may be made by those skilled in the art, for example, two 12-inch lens arrays may be joined to form a 24-inch assembly; four 9-inch arrays may be joined to form a 36-inch assembly, etc. All of these embodiments are intended to be encompassed by the following claims:

What is claimed:

1. A gradient index lens array assembly comprising a plurality of linear gradient index lens arrays, each array having two staggered rows of optical fibers extending along the length of each array, each array connected in a staggered end-to-end configuration forming an extended length linear array assembly.

2. The assembly of claim 1 wherein a portion of the ends of each of the array rows is covered by an opaque mask, each mask terminating along an imaginary line bisecting the overlapping ends of two adjoining arrays.

3. An optical imaging system which includes an improved gradient index lens array assembly for transmitting an image of an object lying in an object plane onto an image plane, the improved lens array assembly comprising:

a plurality of gradient index lens arrays alternately connected end to end along two staggered center lines, the ends of each array containing optical fibers in an overlapping relationship relative to the adjoining array, and masking means to prevent light from being transmitted through said overlapping end regions.

4. A method for assembling a gradient index lens array assembly comprising the steps of:

positioning a plurality of lens arrays in a staggered configuration, bonding the lens arrays to each other along a common end surface, and forming the assembly into a unitary, rectangular configuration by filling in gaps in the assembly with an opaque material.

* * * * *